United States Patent
Zheng et al.

(10) Patent No.: US 8,867,172 B2
(45) Date of Patent: Oct. 21, 2014

(54) ABS DESIGN FOR UNIFORM TOUCH-DOWN AND BACK-OFF IN DFH APPLICATIONS

(75) Inventors: Guoqiang Zheng, San Ramon, CA (US); Wan Ting Looi, Hong Kong (HK); Kwun Pan Ng, Hong Kong (HK); Ellis Cha, San Ramon, CA (US)

(73) Assignees: SAE Magnetics (HK) Ltd., Shatin, N.T. (HK); Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 13/562,612

(22) Filed: Jul. 31, 2012

(65) Prior Publication Data

US 2014/0036384 A1    Feb. 6, 2014

(51) Int. Cl.
   G11B 5/60    (2006.01)
   G11B 21/20   (2006.01)

(52) U.S. Cl.
   USPC .................................... 360/235.7; 360/236.3

(58) Field of Classification Search
   USPC ............................................. 360/235.5–237
   See application file for complete search history.

(56) References Cited

U.S. PATENT DOCUMENTS

| | | | |
|---|---|---|---|
| 7,154,709 B2 * | 12/2006 | Rao et al. | 360/235.8 |
| 7,262,937 B2 * | 8/2007 | Pendray et al. | 360/235.1 |
| 7,436,620 B1 | 10/2008 | Kang et al. | |
| 7,760,469 B2 | 7/2010 | Zhang et al. | |
| 7,920,346 B2 | 4/2011 | Tse et al. | |
| 7,936,538 B1 | 5/2011 | Zhang et al. | |
| 7,969,685 B2 | 6/2011 | Shen et al. | |
| 8,081,400 B1 * | 12/2011 | Hu | 360/236.3 |
| 8,144,422 B2 | 3/2012 | Zhang | |
| 8,184,405 B1 * | 5/2012 | Zheng et al. | 360/266.3 |
| 8,427,784 B2 * | 4/2013 | Sonoda | 360/235.7 |
| 2002/0109941 A1 * | 8/2002 | Chapin et al. | 360/235.7 |
| 2003/0058578 A1 * | 3/2003 | Boutaghou et al. | 360/235.8 |
| 2004/0027724 A1 * | 2/2004 | Pendray et al. | 360/236.3 |
| 2004/0201923 A1 * | 10/2004 | Rao et al. | 360/235.7 |
| 2006/0023354 A1 * | 2/2006 | Stipe | 360/128 |
| 2007/0121238 A1 * | 5/2007 | Kondo et al. | 360/69 |
| 2008/0112086 A1 * | 5/2008 | Hu et al. | 360/235.6 |
| 2008/0198509 A1 * | 8/2008 | Bolasna et al. | 360/235.5 |
| 2010/0039732 A1 * | 2/2010 | Shen et al. | 360/235.4 |
| 2011/0026164 A1 | 2/2011 | Bolasna et al. | |

* cited by examiner

*Primary Examiner* — Adam B Dravininkas

(74) *Attorney, Agent, or Firm* — Saile Ackerman LLC; Stephen B. Ackerman

(57) ABSTRACT

A DFH (Dynamic Flying Height) type slider ABS design has significantly improved DFH efficiency and back-off efficiency as well as uniform touchdown detectability. This is the result of decoupling the local pressure variations at the read/write head that result from skew angle variations across a disk, from local stiffness due to ABS protrusion caused by heater activation. The decoupling, which allows the heater activation stiffness to be carefully tuned, is a result of the effects of airflow channeled by a wide down-track channel onto a narrow down-track channel formed in an extended finger of the central pad of the slider. Airflow impinges on the finger channel in a manner that eliminates variations in air pressure at the central pad due to variations in skew angle.

11 Claims, 5 Drawing Sheets

ABS DESIGN FOR UNIFORM TOUCH-DOWN AND BACK-OFF IN DFH APPLICATIONS

BACKGROUND

1. Technical Field

This disclosure relates to the fabrication of thin film magnetic read/write heads and particularly to the design of a DFH (Dynamic Flying Height) slider air bearing surface (ABS) to achieve high DFH efficiency, back-off efficiency and uniform touchdown detectability across a disk.

2. Description

The present disclosure relates to a hard disk drive (HDD). More specifically, the present disclosure relates to an air bearing surface (ABS) design for a slider that facilitates improving the uniformity of touch-down detection DHS efficiency and back-off efficiency across the stroke for achieving sub-nanometer active clearance and resistance to HDI events such as contact with disk surface lubricants.

In a HDD, the data on a disk is read and written by a magnetic transducer (or read/write head), and each such transducer is embedded within a slider which is mounted on a suspension and flies over the rotating disk with a passive spacing of around 10 nm. During the read/write process, the active spacing is actually reduced, perhaps to below 1 nm, in order to achieve a higher areal density and disk capacity (eg. 1 Tbpsi). The current process of achieving such low fly heights, which is the so-called fly on demand (FOD) or dynamic fly height (DFH) process, controls magnetic spacing via the local thermal protrusion produced by activation of a heater embedded near the transducer.

In order to control the active spacing accurately when applying power to the heater, it's necessary for the slider to find a stable touch-down point as a baseline and then be backed off to a desired spacing for the read/write operation. Typically the backing off process is implemented by application of the well-known (and, therefore, not described here) Wallace Equation algorithm, which has been widely employed in the HDD industry to calculate the relative spacing change in real time.

When heater protrusion causes the slider to touch the rotating disk, many interesting (and typically undesirable) dynamics phenomena appear, to which stiff (high air pressure on ABS) and soft (low air pressure on ABS) air-bearing sliders respond quite differently. At such low clearances, the contact dynamics becomes extremely critical. The dynamics will not only affect touch-down detection and further impact the accuracy of back-off spacing settings, but it will also influence HDD reliability through increased wear, instability and modulation. This is particularly problematic if the head vibrates vigorously after hitting a particle or droplet of lubricant during operation.

Recent experiments and simulations show that there are two stages in the touch-down process. The first stage is soft touch-down (STD, see FIG. 1), producing a low frequency vibration (say, 60 kHz~120 kHz) which is a suspension mode excited by the interference of lubricant on the disk. The second stage is hard touch-down (HTD) with a high frequency vibration (say, 200 kHz~400 kHz) which is the second pitch mode of an air bearing slider excited by the contact between head and disk. Usually a late HTD tends to cause wear due to severe head/disk contact. This occurrence should definitely be prevented in a HDD. On the other hand, to mitigate an early STD requires a soft (i.e., low air pressure) ABS. Unfortunately, such a low pressure ABS might fail to follow disk topography accurately and have a higher risk of fly height (FH) modulation when head/disk interference (HDI) happens during operation.

To ensure a successful detection of STD without the concern of FH modulation, the air bearing stiffness, especially the local stiffness on the heater bulge, needs to be well controlled in an optimal range. ABS stiffness has proven to be one of the dominant factors of touch-down detectability, and a parameter called "integrated force" (IGF) is introduced to quantify the local stiffness in an ABS design. The IGF is the integration of air pressure on the heater-caused protrusion when turning on the heater to achieve a desired active spacing. ABS design with too high IGF will skip the STD phase of a touch-down and cause wear in the HTD phase; while an ABS design with too low IGF will suffer FH modulation, although there is no concern about STD detection. As mentioned above, after detecting touch-down, the slider will be backed off to a desired active spacing for the subsequent read/write operation.

In addition to affecting touch-down detectability, IGF also governs the back-off efficiency. In FOD or DFH applications, when the heater is turned on, there will be a protrusion-induced increase in the air pressure acting on the slider due to the squeezed layer of air within the head/disk interface. The higher pressure is applied to the area of heater protrusion, thus the stiffest local portion of the air bearing layer is at the heater region. This additional air pressure will act counter to the change of fly height spacing, and bring on what is called push-back or fly height compensation. This is the counterproductive effect of actually preventing the local deformation produced by the heater, which is required to yield good DFH or FOD efficiency.

Basically the DFH efficiency is defined as the ratio of the fly height spacing change to the additional height produced by heater-caused protrusion (or, equivalently, to heater power). As a result, in ABS design, a well-controlled IGF will play an important role in achieving uniform touch-down detection and back-off efficiency across the entire disk surface for excellent resolution in read/write operations.

Various approaches have been suggested for achieving higher DFH efficiency. For example, isolated micro pads proposed by Zhang (US Publ. Pat. Appl. No. 2008/0117550 A1) and a bridged micro pad proposed by Shen et al. (U.S. Pat. No. 7,969,685 B2) were disclosed to reduce the push-back effect induced by heater protrusion by reducing the air pressure on the micro pad where read/writer element and heater embedded. While such approaches, along with those of Zhang et al. (U.S. Pat. No. 7,936,538 A1) and Bolsana et al. (US Publ. Pat. Appl. 2011/0026164 A1) attempt to improve DFH efficiency, they ignore relevant issues that will be addressed in the present application and generally fail to achieve comparable results.

It must also be noted that at such low clearances, a variety of proximity interactions, such as intermolecular forces (IMF), meniscus forces and electrostatic force (ESF), along with the increased influence of disk topography, all tend to destabilize the air-bearing slider. Moreover, operating shock, lubricant pickup and environments (altitude/thermal/humidity) sensitivities are also challenges to drive reliability.

Referring to schematic FIG. 1, there is shown a side view of a suspension (5) mounted DFH slider (10) undergoing a soft touchdown (STD) as a result of heater (35) protrusion (20) of the ABS region about the read/write elements (30) located at the trailing edge of the slider. The protruded trailing edge of the slider contacts a layer of lubricant (40) covering the surface of a rotating disk (50) causing the STD. It will be highly desirable to eliminate such events.

Without well-controlled ABS stiffness and IGF on the heater protrusion, the slider/disk contacts would lead to either HTD and wear during touch-down process or FH modulation and instability when HDI occurs. Therefore, there is a need in HDD industry to employ a new concept in ABS topographic features that can sufficiently aid in applications where sub-nanometer clearances are dominant. The present application provides a total solution for uniform touch down detection and back-off efficiency without compromising ABS stiffness and HDD performance.

SUMMARY

It is a first object of this application to improve the DFH efficiency of a slider.

It is a second object of this application to improve the DFH efficiency of a slider while not affecting the ability to detect touchdowns.

It is a third object of this application to achieve the first two objects without compromising control of local ABS stiffness resulting from pressure variations beneath the heater bulge, thereby achieving uniform touch-down detectability and back-off efficiency in the all data zones.

It is a fourth object of this application to achieve the previous three objects while not incurring FH modulations.

These objects will be achieved by means of a new ABS topography design and a fabrication method to implement that design. Referring to schematic ABS planar diagram of FIG. 2, there is shown the proposed ABS design that achieves the objects stated above. From the standpoint of its fabrication, the air-bearing topography of the slider, although complex, is produced via a sequence of only three ion milling (IM) etching processes to produce a layered structure comprising a total of 5 layers at different depths relative to the uppermost surface of the ABS. Some of these 5 layers require more than a single etch to be completed. The process will be fully described below with reference to FIGS. 7a, 7b and 7c.

In the figure, the same density of shading implies the same etch depth, with unshaded areas corresponding to layers formed by the deepest etch and the darkest shading representing the remainder of the uppermost (highest) ABS surface through which the deeper etches have penetrated. For clarity, a legend in the figure depicts the shading densities, from darkest to lightest, in order of increasing depth.

The design pictured in FIG. 2 discloses two topographic features that, acting together, will address the objects set forth above.

The first of the two features is:

(1) A T-shaped structure designed to create an airflow that enhances the slider performance as it moves across the surface of a rotating disk. This T-shaped structure, which will be discussed in further detail below, is created by the bridged (350) intersection of a wide down-track channel (300) and a cross-track channel (250).

The second of the two features is:

(2) A center pad (400), in which the read/write head and heater (700) is embedded, that incorporates a finger (500) with a incised narrow down-track channel (550). This narrow channel allows air flow from the wide down-track channel (300) to reach the read/write head region in such a manner that it decouples the maximum pressure peak under the heater protrusion from the position of the slider above the rotating disk. This ensures that the local ABS stiffness beneath the heater bulge (the so-called IGF) will be well controlled during the entire range of slider motion across the disk, allowing for uniform touchdown detectability and back-off efficiency in all data zones.

BRIEF DESCRIPTION OF THE DRAWINGS

The objects, features, and advantages of the present disclosure are understood within the context of the Detailed Description as set forth below. The Detailed Description is itself understood within the context of the accompanying figures, wherein.

DETAILED DESCRIPTION

Figure 1:
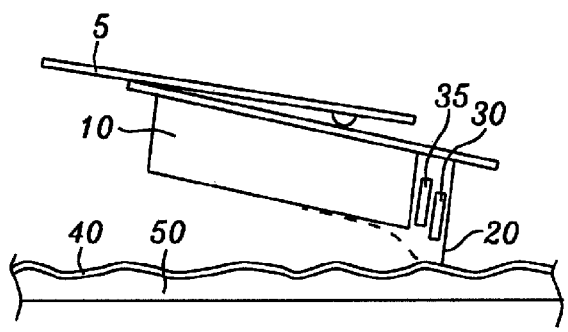
FIG. 1 is a schematic illustration of a typical (not of the presently disclosed design) DFH slider-mounted read/write head in operation within a hard disk drive (HDD) making a soft touchdown (STD) on the lubricant coated surface of a rotating magnetic disk.
Figure 2:
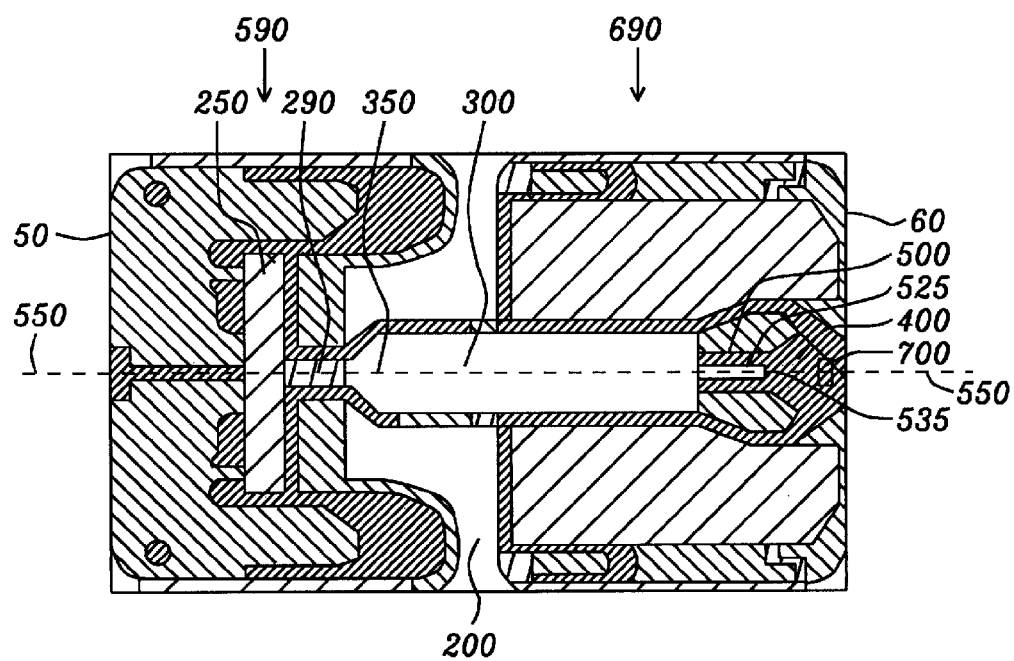
FIG. 2 is a schematic ABS plane illustration of the topography of the presently disclosed slider. The various depths of the five-layered structure are indicated by shading density, from lightest/deepest, to darkest/shallowest.

The ABS geometry/topography of the presently disclosed slider is shown schematically in FIG. 2. The five density levels of shading, indicate the corresponding depths of the etched regions. The lighter the shading, as shown in the legend, the deeper the etched region. The unshaded regions are deepest. The five depths, in increasing order of depth, are: 1. No etching, 2. Depth varying from approximately 0 to 0.4 microns. 3. Depth varying from approximately 0.4 to 2.0 microns. 4. Depth varying in ranges produced by the sum of depths of 2 and 3. 5. Depth less than approximately 5 microns.

The ABS topography is bounded-above by a topmost air-bearing surface layer (100) of darkest shading and, therefore, no etching. This highest level is incised by etching with shallow recesses and deep air grooves. The details of the sequence of etching processes will be discussed below with reference to FIGS. 7a, 7b and 7c.

The slider as a whole has the following dimensions: Length, between approximately 0.85 and 1.25 mm. Width, between approximately 0.5 and 1.0 mm. Thickness, between approximately 0.16 and 0.3 mm.

The slider ABS topography as a whole is split into two portions (500) and (600) by a transverse deep air groove (200) (shown with no shading). The term "transverse" as used hereinafter refers to a direction that is perpendicular to a central axis (550) (dashed line), which is an axis that runs longitudinally from leading (50) to trailing (60) edges of the slider. We will use the terms "transverse" and "longitudinal" when it is necessary to distinguish the two perpendicular directions defining the ABS structure. The longitudinal direction will also be denoted a "down-track" direction because the slider is typically aligned along a disk track in its longitudinal direction. Correspondingly, the transverse direction will be considered a "cross-track" direction. Portion (500) of the ABS can be denoted as the leading edge portion of the ABS topography, and portion (600) as the trailing edge portion of the ABS topography. As will be seen, portion (600) contains the read/write head and heater arrangement. As used conventionally, the "leading edge" of the slider is the edge into which the disk rotates and into which the airflow enters. The trailing edge is the edge out of which the airflow escapes.

The two portions (590) and (690) formed by the transverse deep air groove (200) are bridged along the central axis of slider through a necked-down portion (350) of a wide (constant width) down-track channel (300) whose length is between approximately 50% and 70% of the slider length and whose width is between approximately 10% and 20% of the slider width. The constant width portion of (300) extends longitudinally all the way to the read/write head-containing center pad (400) within the trailing portion (690), where it empties into the narrow down-track channel (525) incised into the finger (500).

There is also another cross-track (transverse) channel (250) in the leading edge portion (590) of the slider. The transverse length of this cross-track channel is between approximately 25% and 75% of the slider width and the width of the cross-track channel is between approximately 35 and 75 microns. These two channels, the longitudinal wide down-track channel (300) and the transverse cross-track channel (250) intersect at a narrow junction (275) where a kink (290) (or bar) is placed inside the narrowed down-track channel. The two intersecting channels form the capital letter "T" in the English alphabet. With the aerodynamic effect of the T-shaped channel system, the flying slider can easily accumulate more airflow in the leading edge portion and guide that airflow directly, through the wide down-track channel (300) onto the center pad (400) in the trailing portion of slider. This enhanced airflow will occur even at high altitude levels where ambient air-pressure is low. The bridge (350) in between the two portions could be formed of sections at different heights so as to control the amount of airflow and, thereby, fine-tune both the fly height profile across the stroke and the pressurization on the center pad, based on the drive mechanical design in radius, skew and revolution.

Besides the novel ABS layout, there is another feature comprising a very narrow down-track channel (525) intentionally designed inside the finger (500) of center pad (400) in which both heater and read/writer element (also known as the pole-tip) are embedded (shown collectively as (700)). As shown in each of the FIGS. 3a, 3b and 3c, the narrow channel is between approximately 20% and 80% of the length of the central pad about 20 μm or less in width, with a depth into the ABS layer of between about 0.4 microns, and less than 5 μm. The narrow channel opens up in the front (leading edge end) and connects to the open trailing edge end of the wide down-track channel (300) in order to receive air flow from the down-track channel directed into the center pad. The closed trailing edge end (535) of the narrow down-track channel, just to the leading edge side of pole-tip/heater region (700) could be a simple closure or any geometrical shape, such as a triangle (FIG. 3b), a rectangle, a trapezoid or a circle (FIG. 3c), to match the ABS shape and air pressurization on the center pad. In this manner, by combining the narrow down-track finger channel with the shape of its end, the local ABS stiffness (so-called IGF) on the heater bulge (protrusion) will be well controlled within an optimal range for uniform touch-down detectability and back-off efficiency in all of the data zones as the slider moves across the disk. The reason for this effect will now be discussed.

During the HDD operation, the disk rotates with an essentially constant rotational velocity to generate the positive and negative air pressures in the slider ABS and form an air bearing layer between the slider ABS and the disk that supports the slider at a narrow spacing above the disk surface. In order to achieve a better flying performance, eg. to make the performance less sensitive to environmental parameters such as altitude, temperature and humidity and more resistant to operating shocks, the conventional ABS designs have incorporated certain geometrical features which, unfortunately, can make the slider more susceptible to changing data zones as it moves across a disk. One of these features, which is found in conventional slider designs, is a finger extending from the central pad towards the leading edge end of the slider. This finger, which is shown schematically as (500) in FIGS. 3a, 3b and. 3c is incised by a channel (525) in the present design but is solid and is not incised by a channel in the conventional ABS design.

Figure 3A:
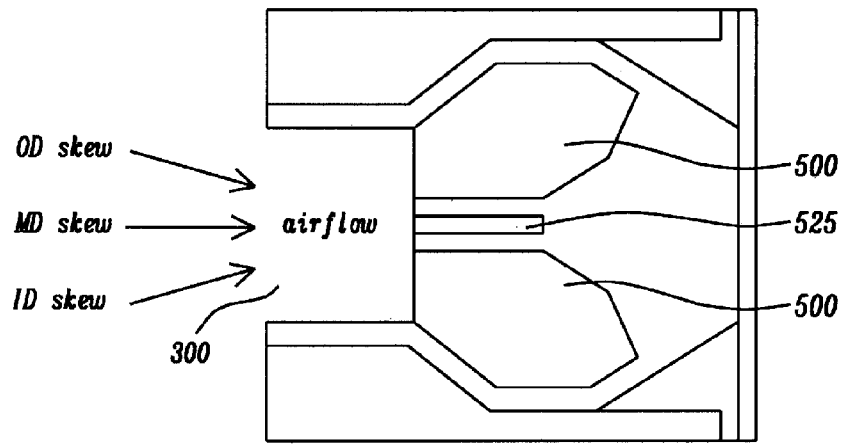
FIGS. 3a, 3b and 3c are each an enlargement of a portion of the schematic planar illustration of the air bearing surface (ABS) structure of the present slider showing the direction of airflow directed at the write head region at different positions along the disk. The three figures show three possible shapes of the narrow down-track channel that directs the airflow.
Figure 3B:
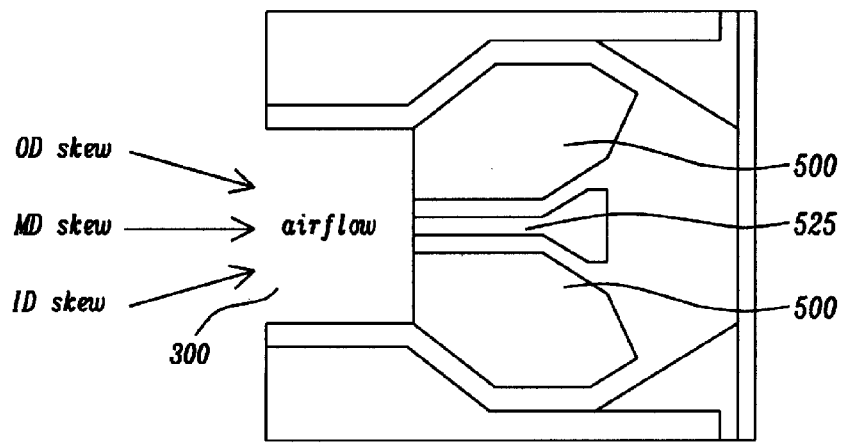
Figure 3C:
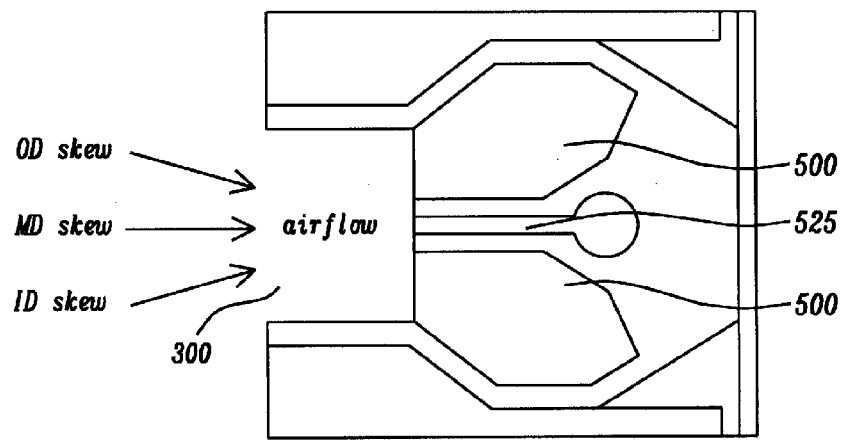

It is well known in the art that in the middle disk (MD) the airflow is mostly blocked by this central finger because of the small skew angle (angle between the slider center line and the tangent to the disk track), whereas at the inner disk (ID) and outer disk (OD) the skew angles are greater. The three skew angles, at the OD, MD and ID, are shown in FIGS. 3a, 3b and 3c relative to the channeled finger (500) and center pad (300) of three possible center pad designs of the present ABS. As a result of skew angle variations, there will be much lower pressure at the pole tip region at the MD skew angle because it is blocked by the head-on position of the finger. This is particularly important at the higher speeds of the most recent HDD designs. However, because of the channel (525) formed in the finger (500) of the present design, air-flow can enter the center pad through the channel and the maximum pressure peak resulting from airflow is effectively decoupled from (i.e., made independent of) the high pressure formed under heater protrusion. This decoupling makes it possible to get local stiffness from heater protrusion balanced across the entire stroke of the slider from OD to ID, which is desired in order to be able to improve DFH efficiency and back-off efficiency. For example, this excellent degree of control over the flying height of the slider greatly lowers the amount of lubricant and smear pickup at the pole-tip region.

Figure 4A:
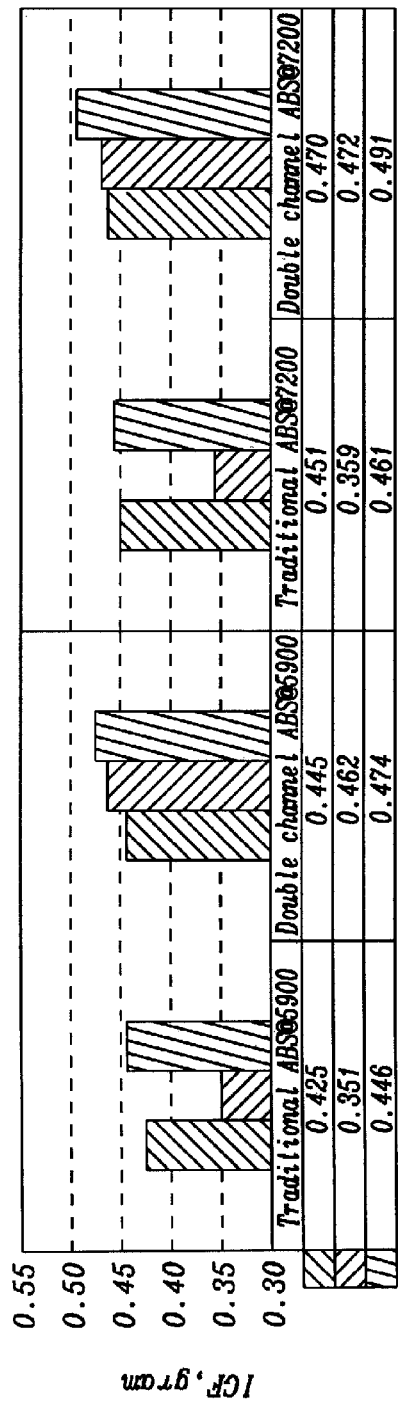
FIGS. 4a and 4b are two sets of charts showing comparisons of ABS local stiffness during touchdowns at 5900 and 7200 RPM in FIG. 4a and comparisons of heater efficiency in a back-off process at 5900 and 7200 RPM in FIG. 4b.
Figure 4B:
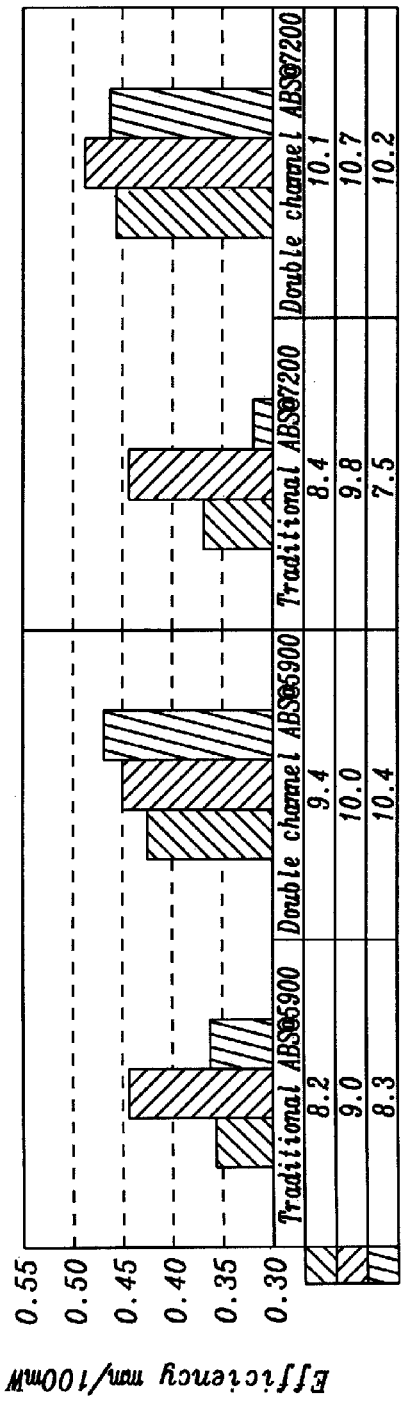

Referring to the charts in FIGS. 4a and 4b, there is shown a comparison between present ABS designs with no finger channel (as in FIG. 3d) and the present "double-channel" ABS design with the finger channel coupled to the down-track channel during a touch-down process. Chart 1 ("The Uniformity of ABS Local Stiffness on DFH Protrusion") in FIG. 4a, on the left side shows the IGF (local stiffness) for a traditional single channel slider design with no finger channel and for the present double channel design with a down-track channel coupled to the finger channel at 5900 RPM. The right side chart shows a similar comparison at 7200 RPM. The present design shows a uniformity of local ABS stiffness on DFH protrusion across the ID, MD and OD, whereas the traditional design shows a decided dip in the MD region. Recall that IGF is the integration of air pressure on the heater protrusion when the heater is activated to achieve a desired active spacing. These chart results indicate the excellent control of uniformity of touch-down detection and back-off efficiency.

Referring now to Chart 2 of FIG. 4b, there is shown a comparison of back-off efficiency (measured in nm/100 mW) between the traditional ABS and the present ABS at ID, MD and OD, at 5900 RPM and 7200 RPM as in FIG. 4a. Once again the superiority of the present design is seen in the uniformity of the efficiencies.

Figure 5:
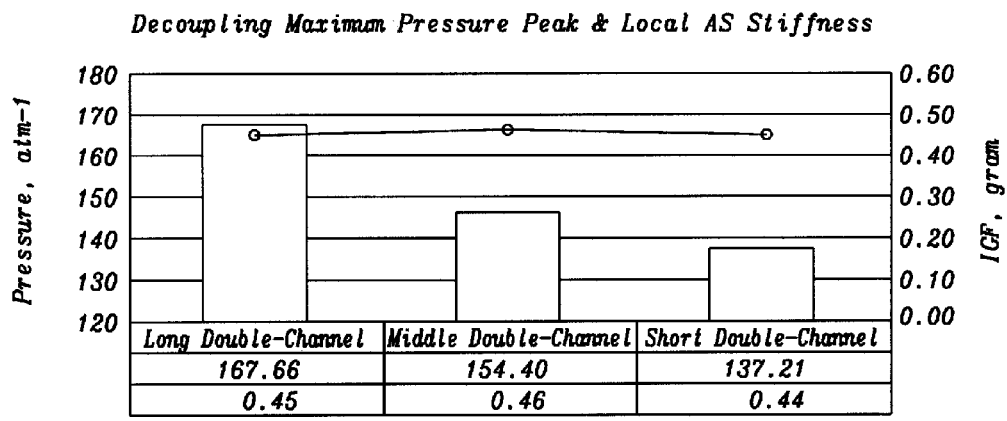
FIG. 5 is a chart showing a comparison of ABS peak pressure with local ABS stiffness for the present ABS design, with three different lengths of the central channel in the finger.
Figure 6A:
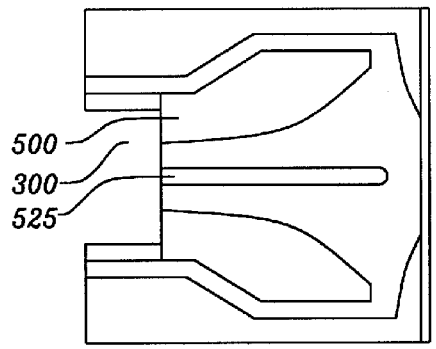
FIGS. 6a, 6b and 6c are schematic enlarged views of the portion of the slider also shown in FIGS. 3a, 3b, 3c. The portion is shown with three different lengths of the central channel and no terminal opening.
Figure 6B:
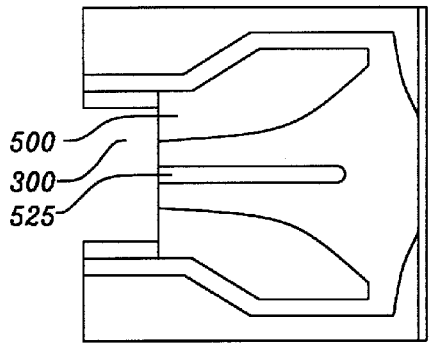
Figure 6C:
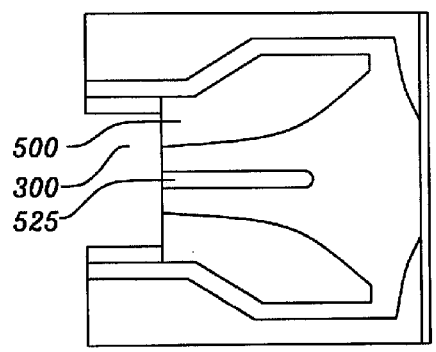

Referring finally to FIG. 5 and to FIGS. 6a, 6b and 6c, there is shown the effect of varying the length of the finger channel ((525) in either of FIGS. 6a, 6b and 6c) on the decoupling of the maximum pressure peak at the read/write head position from the local ABS stiffness resulting from the increase in pressure beneath the heater protrusion during DFH operation. The long finger channel corresponds to FIG. 6a, the middle length finger channel to FIG. 6b and the short finger channel to FIG. 6c. The channels all terminate in a simple closure at the trailing edge end. As can be seen in the three corresponding charts of FIG. 5, the local ABS stiffness measured in grams (horizontal line with three data points) is uniform, while the height of the vertical rectangles, measuring peak pressure in atmospheres, drops as the channel is progressively shorter.

Figure 7A:
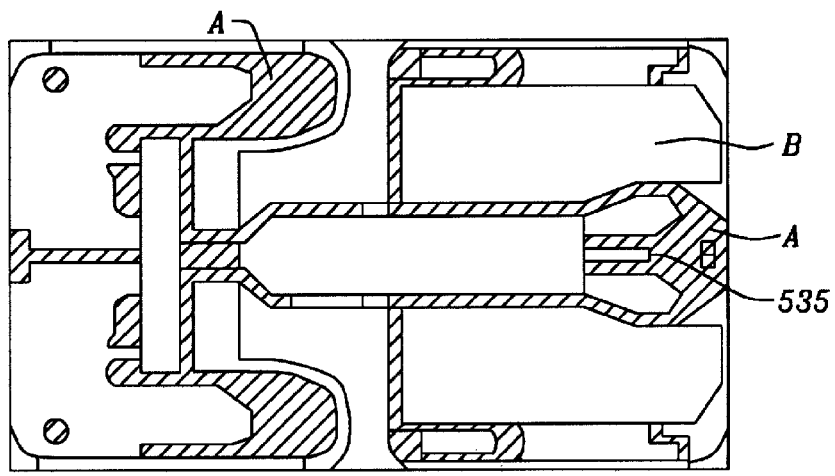
FIGS. 7a, 7b and 7c are a sequence of schematic illustrations showing the corresponding sequence of etching process required to produce the ABS topography of the presently disclosed slider.
Figure 7B:
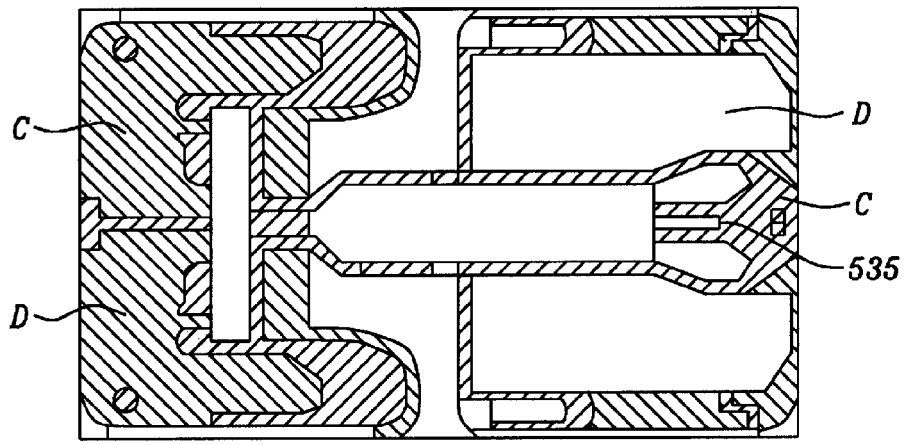
Figure 7C:
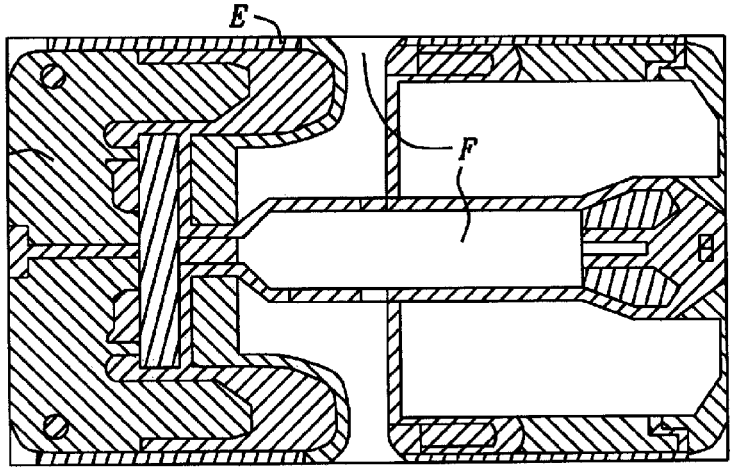

Referring now to FIGS. 7a, 7b and 7c, there is shown schematically three steps of etching that will produce the ABS topography of the present disclosure as illustrated in FIG. 2 and described with reference to FIG. 2. All elements in the present FIGS. 7a, 7b and 7c are identical to the elements referenced in FIG. 2 and have the same dimensions.

FIG. 7a shows the un-etched slider ABS with a shaded region (A) that is protected by a patterned layer of photoresist. The protected area corresponds to regions that will be subsequently etched (second and third etches) to depths previously defined as 1 (no penetration) and 3 (etch between 0.4 and 2.0 microns). The unprotected remainder (B) of the ABS is now subjected to a first etch to a depth of level 2 as defined above. This level is etched to a depth between approximately 0 and 0.4 microns. Note that this region includes the down-track narrow channel (525), which will therefore be etched to that depth. Since the channel will be protected in the subsequent etches of FIGS. 7b and 7c, its depth will remain unchanged. However, because of the role played by this channel in receiving the airflow from the wide down-track channel, it may be desired to etch this narrow channel to a deeper depth. Although this will not be done here, deeper etches are easily implemented by not protecting the channel during subsequent etching processes. Observation of the method of accomplishing the deeper etch of the wide down-track channel, which is performed in FIGS. 7b and 7c, would be the method used to more deeply etch the narrow channel.

Referring now to FIG. 7b, there is shown the now etched ABS of FIG. 7a with a new shaded protected region (C) that corresponds to those portions of the ABS that are to be ultimately etched to the shallowest depths previously denoted as 1 (no penetration) and 2 (depth of etch to between 0 and 0.4 microns). The unprotected (unshaded) portion of the figure (D) is now further etched to a depth that is the sum of the depth (between 0 and 0.4 microns) already etched in FIG. 7a, plus an additional etch depth of between 0.4 and 2.0 microns to produce the depth previously denoted as 4, which is the sum of 2 plus 3, which is between (0 to 0.4 microns) plus between (0.4 and 2.0 microns), or a total depth of between 0.4 and 2.4 microns.

Referring finally to FIG. 7c, there is shown the final etch to produce the deepest regions of the ABS. In this figure, the shaded region (E) is protected by photoresist and the unshaded region (F) is subjected to an additional etch depth that is the sum of previous etch depths plus an additional etch depth to produce the deepest region that is no deeper than approximately 5 microns. Note that (F) includes the wide down-track channel (300). Note also, that depending of desired performance results, the depth of the narrow down-track channel incised in the finger projecting from the central pad, which is here produced by the first etch, may be extended down to the depth of the wide down-track channel by protecting it during the first etch and etching it, instead, during this final etch.

As is understood by a person skilled in the art, the preferred embodiments of the present disclosure are illustrative of the present disclosure rather than being limiting of the present disclosure. Revisions and modifications may be made to methods, processes, materials, structures, and dimensions through which is formed a DFH type slider having touchdown detectability, backoff efficiency and a decoupling of the maximum ABS air pressure peak from local pressure increase due to heater protrusion during HDD operation, while still providing such a DFH type slider, formed in accord with the present disclosure as defined by the appended claims.

What is claimed is:

1. A DFH slider comprising:
   an ABS having a length and a width and an incised topography, including transversely separated leading and trailing portions, wherein
   said trailing portion includes a read/write head and adjacent heater for DFH operations embedded at a trailing edge end of a central pad formed symmetrically about a central axis; and wherein
   said central pad includes a finger extending longitudinally in a leading edge direction from a point to the leading edge side of said read/write head and heater; and
   wherein said finger is incised by a narrow down-track channel having a first width and a first depth and formed symmetrically about said central axis and extending longitudinally from an opening in said leading edge of said finger in a direction towards said read/write head and adjacent heater but terminating before reaching said read/write head and heater; and wherein
   a leading edge end of said narrow down-track channel is open and said trailing edge end of said channel is simply closed or is closed in a geometrical form as a triangle, a circle, a rectangle or a trapezoid; and
   a wide down-track channel formed symmetrically about said central axis, said wide down-track channel having a trailing edge portion with a trailing edge opening, and a leading edge portion with a leading edge opening and a bridged intersection between a down-track and cross-track channel, said bridged intersection having a variable width and a variable depth but being symmetric about a central down-track axis and continuously connecting said trailing edge and leading edge portions, wherein said trailing edge opening abuts said leading edge end of said central pad whereat said trailing edge opening of said wide down-track channel connects with said leading edge opening in said narrow down-track channel incised in said finger; and wherein
   said leading edge portion of said down-track channel abuts a transverse cross-track channel symmetrically formed in said leading edge portion and wherein said abutment forms a T shape.

2. The DFH slider of claim 1 wherein said narrow down-track channel incised in said finger is less than 20 microns in width and approximately 5 microns in depth and has a length that is between 20% and 80% of a length of said central pad.

3. The DFH slider of claim 1 wherein said wide down-track channel generates an airflow directed into said leading edge end of said narrow down-track channel incised into said finger.

4. The DFH slider of claim 3 wherein said airflow produces a constant local air pressure at said central pad that is independent of skew angle.

5. The DFH slider of claim 1 wherein supplying power to said heater produces a local ABS protrusion around said read/write head which, in turn, produces a local stiffness beneath said protrusion due to an increase in air pressure beneath said protrusion and wherein said local stiffness is independent of a radial position of said DFH slider above a rotating disk.

6. The DFH slider of claim 5 wherein said constant local air pressure that is independent of skew angle is, therefore, decoupled from the local stiffness produced by heater protrusion.

7. The DFH slider of claim 6 wherein said decoupling of said constant local air pressure and said local stiffness caused by heater protrusion allows the effects of heater protrusion to be fine-tuned, thereby increasing DFH efficiency and back-off efficiency and allowing uniform touchdown detectability.

8. The DFH slider of claim 1 wherein said wide down-track channel has a length that is between 50% and 70% of said ABS length and a width that is between 10% and 20% of said ABS width and a depth of approximately 5 microns or less.

9. The DFH slider of claim 1 wherein said narrow down-track channel incised in said finger has a length of between approximately 20% and 80% of the length of said central pad, a width of approximately 20 microns or less and a depth of approximately 0.4 microns.

10. The DFH slider of claim 1 wherein a bridging portion of said down-track channel is reduced in width to form a continuous connection between said leading edge and said trailing edge portions.

11. The DFH slider of claim 1 wherein said cross-track channel has a length between approximately 25% and 75% of said ABS width and a width between about 35 and 75 microns.

* * * * *